United States Patent
Becker et al.

(10) Patent No.: US 6,531,667 B2
(45) Date of Patent: Mar. 11, 2003

(54) PEDAL DISPLACEMENT SENSOR

(75) Inventors: Manfred Becker, Frankenthal (DE); Ralf Kapell, Bickenbach (DE); Rainer Oberheim, Bensheim (DE)

(73) Assignee: Deere & Company ASG Luftfahrttechnik, Moline, IL (US)

( * ) Notice: Subject to any disclaimer, the term of this patent is extended or adjusted under 35 U.S.C. 154(b) by 71 days.

(21) Appl. No.: 09/846,307

(22) Filed: May 2, 2001

(65) Prior Publication Data

US 2002/0056625 A1 May 16, 2002

(30) Foreign Application Priority Data

May 19, 2000 (DE) .......................... 100 24 921

(51) Int. Cl.⁷ ................................ H01H 3/14
(52) U.S. Cl. ................. 200/86.5; 200/302.1; 200/302.3
(58) Field of Search ............................ 74/512–514, 560; 200/61.29, 4.89, 86.5, 302.1, 302.3

(56) References Cited

U.S. PATENT DOCUMENTS

| | | | |
|---|---|---|---|
| 2,301,584 A | 11/1942 | Rodrick | 177/337 |
| 4,282,509 A * | 8/1981 | Newman | 200/61.86 |
| 4,793,620 A * | 12/1988 | Karch | 277/636 |
| 4,853,502 A * | 8/1989 | Canipe | 200/559 |
| 5,241,144 A * | 8/1993 | Meagher et al. | 200/61.89 |
| 5,321,219 A * | 6/1994 | Meagher et al. | 200/61.89 |
| 5,416,295 A * | 5/1995 | White et al. | 200/61.89 |
| 5,920,048 A | 7/1999 | Crippen et al. | 200/61.89 |
| 6,064,015 A * | 5/2000 | Braaten | 200/86.5 |
| 6,330,838 B1 * | 12/2001 | Kalsi | 200/61.89 |

FOREIGN PATENT DOCUMENTS

| | | | |
|---|---|---|---|
| DE | 17 91 679 | 1/1956 | |
| DE | 2923450 C2 | 12/1980 | G01D/5/14 |
| DE | 3445243 A1 | 6/1986 | G01B/21/22 |
| DE | 3844020 C2 | 6/1990 | G01B/7/00 |
| DE | 4109658 A1 | 9/1992 | G05G/1/14 |
| DE | 4407005 C1 | 3/1995 | B60K/26/02 |
| DE | 29700862 U1 | 4/1997 | G05G/1/14 |
| DE | 19835694 A1 | 2/2000 | G01L/3/10 |
| FR | 1 481 263 A | 4/1967 | |
| JP | 08234856 A | 9/1996 | G05G/5/04 |

* cited by examiner

Primary Examiner—Michael Friedhofer

(57) ABSTRACT

A pedal displacement sensor includes an actuating lever and a switching element. The actuating lever is arranged in a housing, is rotatably supported on a rotational axis, and can be rotated by a pedal. The actuating element of the switching element is actuated by rotating the actuating lever. The housing of the pedal displacement sensor has an opening. The actuating lever extends through the opening to an end which engages the pedal. The actuating lever includes first and second arms which form an angle lever. The first arm is rotatably supported in the housing. The second arm extends through the opening to an end face which contacts the pedal lever. The actuating lever preferably also acts upon a transducer such as a Hall sensor and a permanent magnet.

14 Claims, 4 Drawing Sheets

PEDAL DISPLACEMENT SENSOR

BACKGROUND OF THE INVENTION

The invention relates to a pedal displacement sensor.

In motor vehicles, it is customary practice to arrange within the region of a pedal one or more electric switches that determine the pedal position and deliver corresponding control signals. For example, some agricultural tractors have right and left brake pedals which can be operated separately in order to drive through tight curves. Each brake pedal acts directly upon one brake cylinder. The trigger element of a brake light switch, which is actuated when the pedal is actuated and delivers an electrical signal to the brake light, is arranged within the travel range of each pedal. In this case, the actuation point is frequently subject to a relatively marked hysteresis that is acceptable for the actuation of brake lights.

It would be desirable to make functions of the vehicle other than the brake lights, e.g., the addition of a front wheel drive and the actuation of a differential lock, dependent on the position of the brake pedal. However, these functions make it necessary to have a precise relationship between pedal displacement and switch activation.

In U.S. Pat. No. 5,920,048, it is proposed to determine the position of the accelerator pedal and the brake pedal of an electric vehicle with devices in which an electric switch and an adjustable resistor are arranged in a housing. A shaft extends through the housing and is connected to the accelerator pedal or the brake pedal and turns in accordance with the pedal movement. The shaft is connected to a pivoted actuating element which acts upon the switch when the shaft is turned. A wiper is mounted on the actuating element and moves over a resistive coating when the shaft is turned. This causes the resistance of an electric circuit to change such that a signal corresponding to the pedal position is generated. This device is relatively complicated because it requires a shaft that is connected to a pedal, and it may be difficult to adapt it to existing pedal arrangements. Due to the mechanical brush contacts, this device is also relatively susceptible to defects, and is not very accurate.

SUMMARY

Accordingly, an object of this invention is to provide a pedal displacement sensor of the type initially mentioned that eliminates the aforementioned problems.

A further object of the invention is to provide such a pedal displacement sensor which provides a reliable determination of the pedal position with reproducible, largely hysteresis-free switching points.

A further object of the invention is to provide such a pedal displacement sensor which has a simple design, and which is simple to install and does not require complicated adaptations or subsequent adjustments.

These and other objects are achieved by the present invention, wherein a pedal displacement sensor has a housing with an opening through which extends a portion of a pivoting actuating lever. A portion of the lever outside the housing operatively engages a brake pedal, so that the pedal acts directly upon the lever, i.e., without intermediate components such as shafts, levers and the like. As a result, the risk of jamming or seizing is, in contrast to linear movements, significantly reduced, and hysteresis effects are largely avoided.

The pedal displacement sensor is preferably separately manufactured in the form of a simple pre-adjusted component and can be mounted in the vicinity of the pedal lever with simple means, e.g., screw connections, without requiring adaptation measures and subsequent adjustments. Special precautions for the transmission of power between the pedal lever and the actuating lever of the pedal displacement sensor are not required.

Preferably, the actuating lever is an angle lever having a first arm and a second arm joined together to form a bend. The first arm is rotatably supported, and the second arm projects out of the opening in the housing. The second arm has an end face which is subjected to a pedal force which acts essentially perpendicularly upon the end face.

The housing is preferably compact and stable. The housing walls, in particular, the lead-throughs for electrical lines, are hermetically sealed so that environmental influences, e.g., dust and splash water, do not impair the function of the pedal displacement sensor. Within the region of the opening in the housing, the housing is sealed relative to the actuating lever, in particular, relative to the end of its second arm, by a flexible rubber collar.

The actuating element of the switch is preferably arranged in the vicinity of the bend of the angle lever and lies approximately opposite to the end face of the second arm. The greatest excursion of the angle lever occurs in the vicinity of the bend, so that the switching element is able to respond to actuations of the pedal lever in a relatively precise fashion. The switching element preferably consists of a commercially available microswitch with a pushbutton.

Preferably, a spring tongue is mounted on the actuating lever, with the free end of the spring tongue acting upon the actuating element of the switch. This prevents the entire force exerted upon the actuating lever from being transmitted to the actuating element of the switch and avoids damage to the switching element or variations in its switching point. Consequently, one preferred additional development of the invention proposes that the actuating lever does not act directly upon the actuating element. A limit stop may be integrated into the contour of the housing and arranged in the travel path of the spring tongue in order to limit its excursion.

A spring, such as helical compression spring, urges the actuating lever away from a position that corresponds to the position of the depressed pedal (e.g., the braking position), with the actuating element of the switching element not being actuated by the actuating lever in this position. The spring preferably engages the lever near the bend between the two arms and presses the actuating lever in the direction opposite to the force occurring during pedal actuation.

The actuating lever acts upon a measurement device or transducer which generates an electrical signal representing the rotational position of the actuating lever, and thus the position of the pedal. Preferably, the transducer is a non-contacting transducer, such as a Hall sensor with a magnet. A permanent magnet that moves with the actuating lever is preferably arranged on the actuating lever, with the Hall sensor being fixed in the housing within the magnetic field of the permanent magnet. When the permanent magnet is moved due to actuation of the actuating lever, the magnetic flux within the region of the Hall sensor, and consequently its output signal, are changed. Preferably, the permanent magnet is mounted on the actuating lever near to its rotational axis, and is aligned so that an axis which connects the magnetic north pole and the magnetic south pole extends approximately perpendicular to the rotational axis of the actuating lever.

In order to achieve a largely linear correlation between the pedal position, and consequently the rotational position of the actuating lever, on the one hand, and the sensor signal on the other hand, one particularly advantageous arrangement of the Hall sensor is characterized by the fact that the Hall sensor is arranged to be approximately in the mid-plane extending between the magnetic north pole and the magnetic south pole of the permanent magnet. In this arrangement, the permanent magnet moves almost linearly along its north-south alignment past the Hall sensor when the actuating lever is turned. Consequently, the Hall sensor signal is approximately proportional to the rotational position of the permanent magnet and thus is proportional to the excursion of the actuating lever and the pedal displacement.

In motor vehicles which have two brake independently operable brake pedals, the pedal displacement sensor preferably includes two rotatable actuating levers in a single sealed housing, each corresponding to one of the brake pedals. A switching element and a transducer is assigned to each of the two actuating levers.

In order to allow a direct evaluation of the signals of the switching elements and transducers, it is advantageous to arrange additional electrical or electronic components in the housing of the pedal displacement sensor, such as relays and/or printed circuit boards with electrical components. This reduces the requirements with respect to cable harnesses and plug connections.

Preferably, the pedal displacement sensor is a pre-assembled module, in which all components that determine the pedal position are accommodated in a hermetically sealed housing, and which can be manufactured and adjusted so that it is ready for use by a component supplier. Then, during final assembly of the motor vehicle, the module can be installed in the vicinity of the pedal in the form of a unit, without requiring any subsequent adjustments.

DETAILED DESCRIPTION

Figure 1:
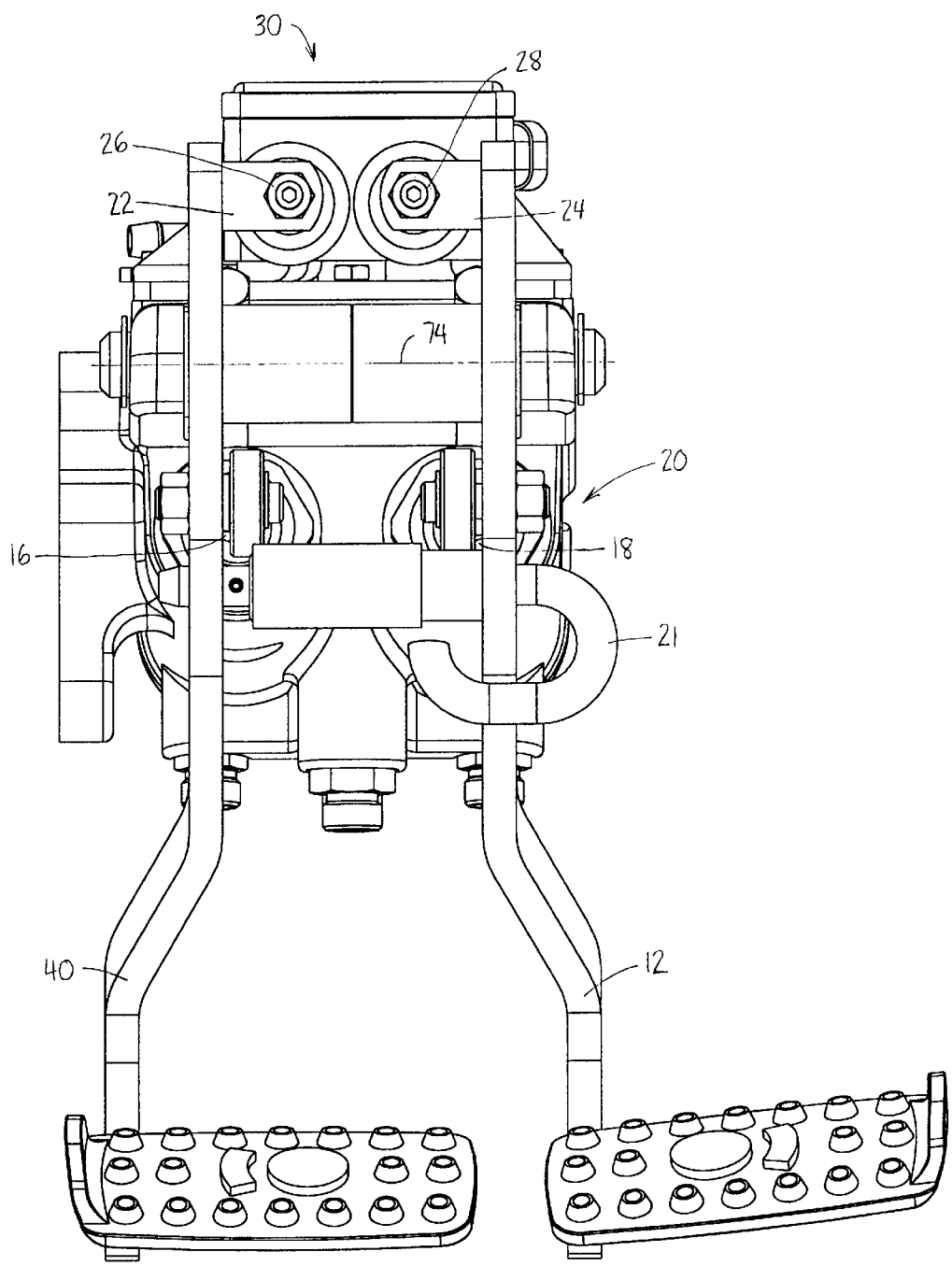
FIG. 1 shows a brake pedal arrangement with two brake pedals according to the present invention.

Referring to FIG. 1, two brake pedals 10, 12 are supported in a pivoted fashion by a rotational axis 14. Each brake pedal 10, 12 acts upon a corresponding brake piston 16, 18, with both brake pistons 16, 18 being arranged in a common brake valve housing 20. The brake pedals 10, 12 can be operated independently of one another. However, the brake pedals can also be connected with the aid of a connecting bar 21 in such a way that, when operating one brake pedal 10, 12, the other brake pedal 10, 12 is also actuated, i.e., both brake pistons 16, 18 are actuated simultaneously.

Figure 2:
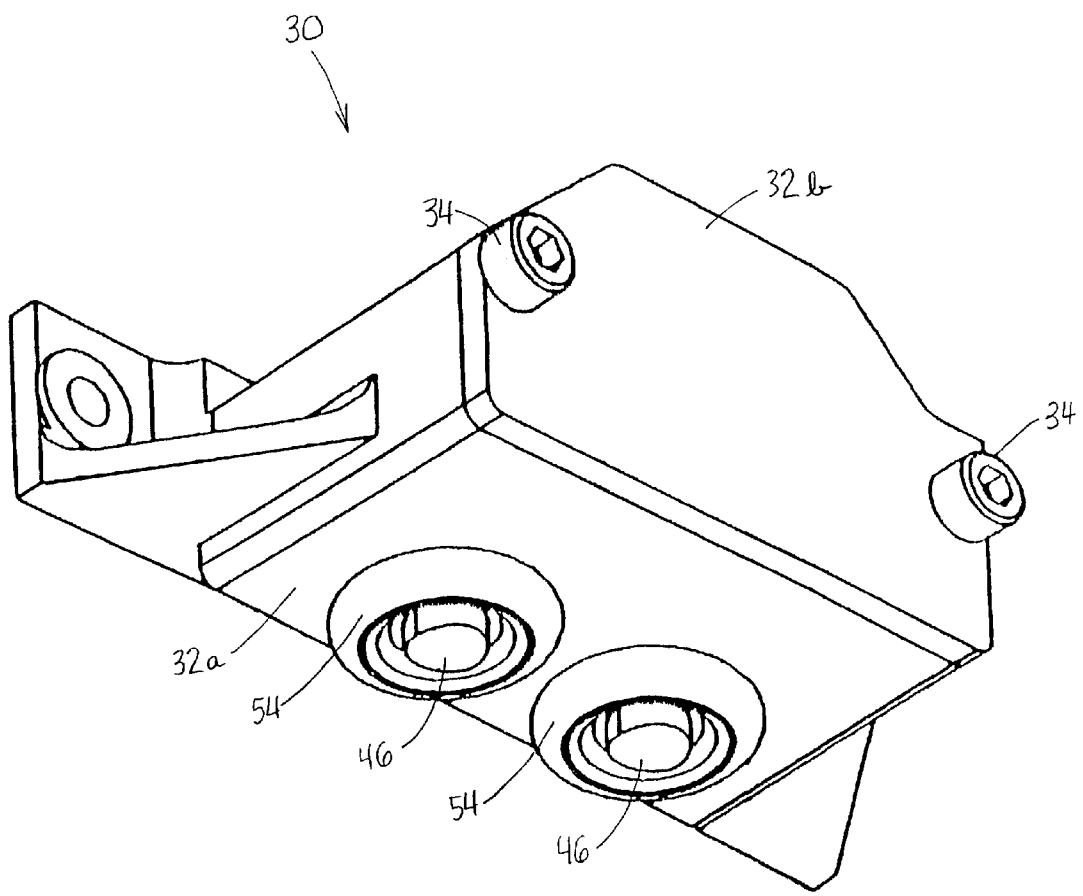
FIG. 2 is a perspective view of a pedal displacement sensor according to the invention.

Transverse brackets 22, 24, which respectively accommodate one set screw 26, 28, are integrally formed onto the upper free end of each brake pedal 10, 12. The set screws 26, 28 can be turned in order to adjust how far they protrude out of the respective brackets 22, 24. This allows an adaptation to the trigger elements of the pedal displacement sensor. The set screws 26, 28 can be conventionally fixed in their respective positions by means of locknuts (not shown). A pedal displacement sensor 30, which is shown in FIG. 2, is attached to the brake valve housing 20 at the height of the brackets 22, 24 by means of two screws.

The housing 32 of the pedal displacement sensor consists of a pot-shaped base part 32a and a cover 32b that can be fixed to the base part 32a by means of two screws 34 and hermetically seals the base part 32a with the aid of a seal, not shown. The cover may also be welded to the base part.

Figure 3:
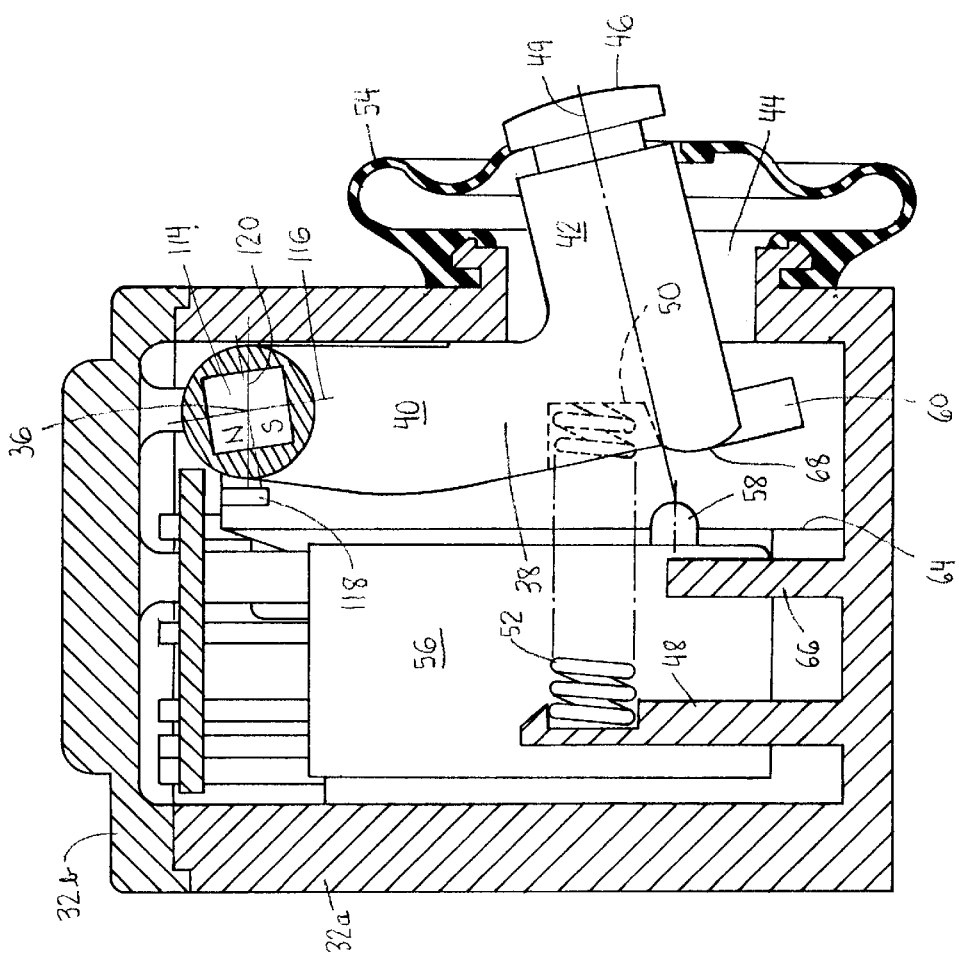
FIG. 3 is a sectional view of the pedal displacement sensor according to the invention.

Two essentially identical actuating levers 38 are supported in the sensor housing 32 such that they can be pivoted about a rotational axis 36, with only one actuating lever being visible in FIG. 3. The actuating lever 38 has the form of an angle lever and with a first arm 40 joined at a bend 68 to a second arm 42. An end of arm 40 is pivotal about a rotational axis 36. The second arm 42 projects out of the sensor housing 32 through an opening 44 in the housing. The two arms 40, 42 form an angle of nearly 90°.

For reasons of material savings and weight reduction, the lever 38 includes cavities (not shown). In the vicinity of the bend 68, the lever 38 includes a recess 50 which receives one end of a helical compression spring 52. The other end of compression spring 52 is braced on an intermediate wall 48 of the sensor housing 32. The compression spring 52 presses the second arm 42 outward through the opening 44 in the sensor housing 32 such that the end face 46 of the second arm 42 makes contact with the corresponding set screw 26, 28. The second arm 42 is aligned such that its center line 49 approximately intersects the center of the end face 46 of the second arm 42 and is directed toward the actuating element 58 of a switching element or microswitch 56.

A flexible rubber collar 54 seals the sensor housing 32 relative to the second arm 42 of the lever 38 in the region of the opening 44 in the housing, but permits sufficient movement of the angle lever 38.

A pair of microswitches 56 are mounted in the interior of the housing, each respectively assigned one of the two levers 38, with only one microswitch being visible in FIG. 3. Each microswitch 56 includes a pushbutton 58, actuation of which switches the switching state of the microswitch 56. The pushbutton 58 is situated in the vicinity of the bend 68 of the lever 38. Suitable microswitches are, for example, distributed under the designation Micro Switch or Miniatur-Basisschalter by the firms Cherry and Honeywell with branch offices in Auerbach/Opf., DE and Offenbach, DE, respectively. These inexpensive mass-produced items can be subjected to mechanical loads and are quite versatile. These switches have a high switching capacity (e.g., 25 A) and small structural size (e.g., 30 mm×20 mm×10 mm).

Figure 4:
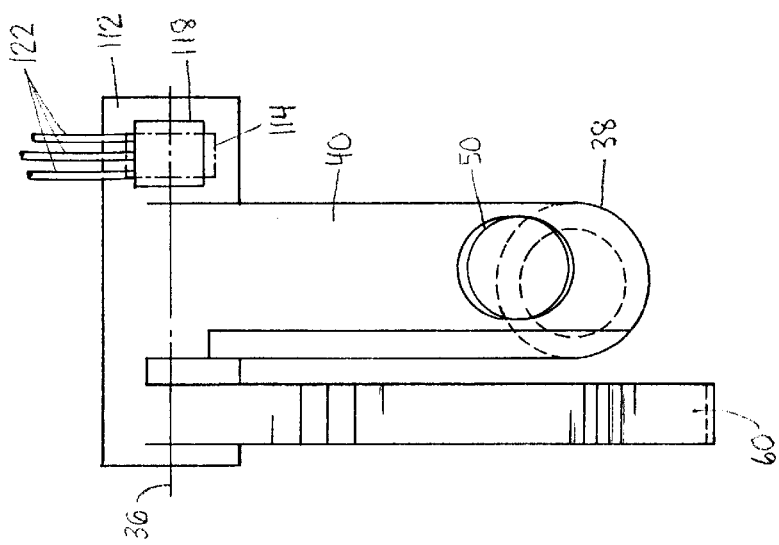
FIG. 4 is a view of an actuating lever.

As best seen in FIG. 4, the lever 38 includes a spring tongue 60 that is integrally formed onto the actuating lever in the vicinity of the rotational axis 36 and essentially extends parallel to the first arm 40. The free end of the spring tongue 60 includes a contact surface 62 that is situated opposite the pushbutton 58 and is pressed against the pushbutton 58 when the corresponding brake pedal 10, 12 is operated, to actuate the microswitch 56. An edge 64 of the housing, which limits the excursion of the spring tongue 60 and thus protects the pushbutton 58 from excessively high loads, is situated opposite the free end of the spring tongue 60. The stroke of the lever 38 is limited by an inner housing wall 66, against which the region of the bend 68 impacts during full actuation of the lever 38. This measure also serves to preventing damage.

The lever 38 has a cylindrical shape in the region of the rotational axis 36. A recess in a cylindrical end section 112 receives a permanent magnet 114. The permanent magnet 114 is oriented so that an axis 116 which connects the magnetic north pole N and the magnetic south pole S extends perpendicular to the rotational axis 36. A Hall sensor 118, with electric supply lines 122, is mounted in the sensor housing 32 in the vicinity of the permanent magnet 114. The Hall sensor 118 is arranged approximately in the mid-plane 120 that extends between the magnetic north pole N and the magnetic south pole S of the permanent magnet 114. As a result, magnet 114 moves almost linearly along its north-south alignment past the Hall sensor 118 when the lever 38 is pivoted. This provides a largely linear correlation between the pedal position, and consequently the rotational position of the lever 38, on the one hand, and the sensor signal on the other hand. Consequently, the Hall sensor signal is approximately proportional to the rotational position of the permanent magnet 117 and thus is proportional to the excursion of the lever 38 and the displacement of pedal 10,12.

In addition to the aforementioned components, other electrical components, e.g., relays and printed circuit boards (not shown), may also be accommodated in the sensor housing 32. At least one hermetically sealed lead-through for electric lines, (not shown), is situated in the housing wall. The lines connect the electrical components in the interior of the sensor housing 32 to the plug contacts of a plug, (not shown), that is integrated into the sensor housing 32. A motor vehicle wiring harness can be connected to this plug.

Figure 5:
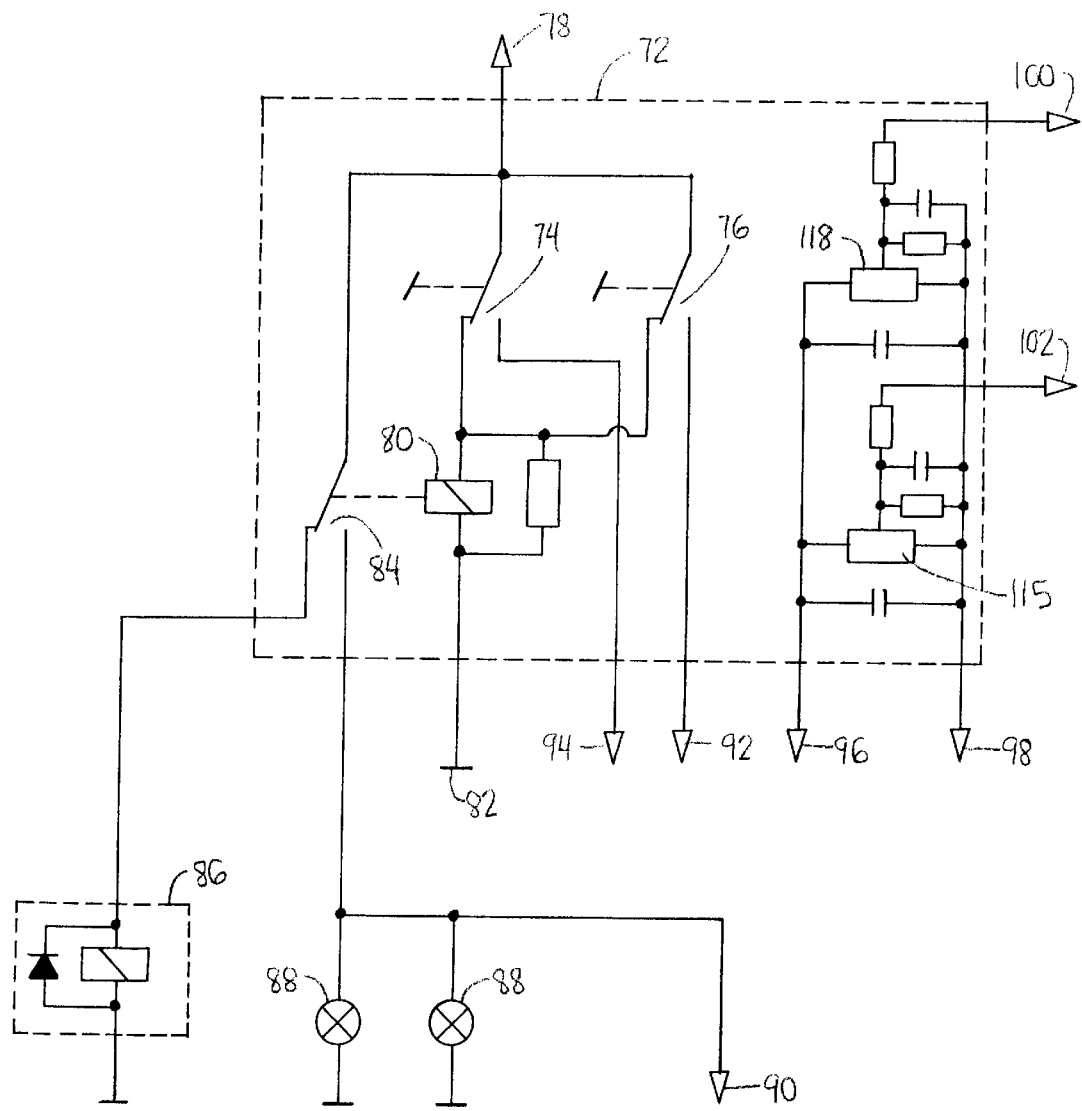
FIG. 5 is an electric circuit diagram for a pedal displacement sensor according to the invention.

The electric circuit 72 of FIG. 5 is arranged within the housing 32 of the pedal displacement sensor. The components of circuit 72, including conventional switches, Hall sensors, relays, resistors and capacitors, may be mounted on a printed electrical circuit board (not shown), and arranged in the sensor housing 32. In order to protect the transducer as well as other electrical components in the sensor housing from interference by external magnetic fields, it is expedient to arrange a magnetic shield (not shown), e.g., an iron sheet, in the housing 32.

The circuit 72 includes two brake pedal switches 74, 76, each corresponding to one of the microswitches 56, and are respectively assigned to one of two brake pedals 10, 12. A battery lead 78 of the brake pedal switches 74, 76 is connected to the motor vehicle battery (not shown). When the brake pedals 10, 12 are not actuated, the brake pedal switches 74, 76 are in an idle position (shown), and the battery lead 78 is connected via the brake pedal switches 74, 76 to a relay 80, the second connection 82 of which is grounded. The relay 80 actuates a switch 84 that connects the battery lead 78 to a brake valve relay 86 assigned to the air pressure brakes of a trailer (not shown).

With switches 74, 76 in the position shown in FIG. 5, the battery lead 78 is connected to the relay coil 80. This energizes the relay coil 80 and places switch 84 in the position shown in FIG. 5. If both brake pedals 10, 12 are depressed, this opens switches 74, 76 and de-energizes the relay coil 80 and the relay returns to its deactivated state (not shown) and relay switch 84 connects the battery lead 78 to the brake lights 88 of the motor vehicle, and to supply the brake lights (not shown) of a trailer (not shown) with a voltage via a connection 90. When the brake pedals 10, 12 are actuated, the corresponding brake pedal switch 74, 76 delivers a corresponding voltage signal to an electric motor vehicle control (not shown), via a connection 92, 94.

The circuit 72 also includes two Hall sensors 118, 119, each of which is assigned to one of the brake pedal 10, 12. As is conventional, the Hall sensors 118, 119 are equipped with resistors and capacitors. The Hall sensors 118, 119 are connected to a 5 V voltage source via a first connection 96 and grounded via a second connection 98. The output lines 100, 102 of the Hall sensors are connected to a motor vehicle control (not shown), which preferably evaluates the brake pedal position determined by means of the Hall sensors 118, 119.

The Hall sensor is a non-contact sensor which provides reliable signals, and which is largely independent of corrosion and other interfering influences while providing a high degree of measurement accuracy. Such a Hall sensor responds very sensitively to changes in the magnetic flux, such that even very small angular movements of the actuating lever can be detected. The characteristic, of the Hall sensor, i.e., the dependence of the sensor signal on the position of the actuating lever, can be easily adapted to requirements by adapting the electronic Hall sensor components or by programming the evaluation electronics accordingly. Consequently, the accuracy with which the Hall sensor and the permanent magnet are mounted need not be subject to strict requirements, because any deviations can be subsequently compensated by means of electrical or electronic adjustments.

This modular design also makes it possible to provide different options for different requirements, with the same housing shape and the same design of the actuating lever. For example, two switches and only one sensor or two switches and one relay or two switches and two sensors or two switches, two sensors and one relay can be arranged in one standard housing with two actuating levers.

This pedal displacement sensor allows reliable determination of the pedal position with high sensitivity of the transducer and with reproducible switching points. With precise pre-adjustment, hysteresis effects of the switching elements can be prevented or at least reduced. The signal of the transducer that corresponds to the pedal position may, for example, be used to electronically control the motor vehicle engine or to influence the engine characteristic curve.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A pedal displacement sensor having at least one actuating lever which is arranged in a housing, the lever being rotated by a pedal about a rotational axis, and having at least one switching element having an actuating element which is actuated by rotating the actuating lever, characterized by:

the housing having an opening;

the actuating lever extending through the opening to an end which is exterior to the housing and which is operatively coupled to the pedal, the actuating lever comprising an angle lever having a first arm and a second arm joined together to form a bend, the first arm being rotatably supported, and the second arm projecting out of the opening in the housing, the second arm having an end face which is subjected to a pedal force which acts essentially perpendicularly upon the end face;

a flexible rubber collar which seals the opening between the housing and the second arm; and the actuating element of the switching element is positioned near to the bend of the angle lever and approximately opposite to the end face.

2. The pedal displacement sensor of claim 1, further comprising:
a flexible rubber collar which seals the opening between the housing and the second arm.

3. The pedal displacement sensor of claim 1, wherein:
the at least one switching element comprises a microswitch with a pushbutton.

4. The pedal displacement sensor of claim 1, wherein:
the actuating lever acts upon a transducer which generates an electrical signal which represents a rotational position of the actuating lever.

5. The pedal displacement sensor of claim 4, wherein:
the transducer comprises a Hall sensor and a magnet.

6. The pedal displacement sensor of claim 5, wherein:
the magnet is a permanent magnet which is mounted on the actuating lever, and the Hall sensor is fixedly mounted in the housing within a magnetic field of the permanent magnet.

7. The pedal displacement sensor of claim 6, wherein:
the Hall sensor is positioned near to a mid-plane which extends between a magnetic north pole and a magnetic south pole of the permanent magnet.

8. The pedal displacement sensor of claim 1, comprising:
a pair of brake pedals;
two actuating levers rotatably supported in the housing, each of said actuating levers being operatively coupled to a respective one of the brake pedals; and
a pair of switching elements, each of said pair of switching elements being associated with one of the actuating levers.

9. The pedal displacement sensor of claim 1, wherein:
a circuit board with electrical components is arranged in the housing.

10. The pedal displacement sensor of claim 1, wherein:
the pedal displacement sensor comprises a preassembled module.

11. A pedal displacement sensor having at least one actuating lever which is arranged in a housing, the lever being rotated by a pedal about a rotational axis, and having at least one switching element having an actuating element which is actuated by rotating the actuating lever, characterized by:
the housing having an opening;
the actuating lever extending through the opening to an end which is exterior to the housing and which is operatively coupled to the pedal; and
a spring tongue is mounted on the actuating lever, the spring tongue having a free end of which acts upon the actuating element of the at least one switching element.

12. The pedal displacement sensor of claim 11, wherein:
a limit stop for limiting movement of the spring tongue is positioned in a travel path of the spring tongue.

13. A pedal displacement sensor having at least one actuating lever which is arranged in a housing, the lever being rotated by a pedal about a rotational axis, and having at least one switching element having an actuating element which is actuated by rotating the actuating lever, characterized by:
the housing having an opening;
the actuating lever extending through the opening to an end which is exterior to the housing and which is operatively coupled to the pedal, the actuating lever comprises an angle lever having a first arm and a second arm joined together to form a bend, the first arm being rotatably supported, and the second arm projecting out of the opening in the housing, the second arm having an end face which is subjected to a pedal force which acts essentially perpendicularly upon the end face, actuation of the pedal moves the actuating lever in a first direction; and
a spring is biased to urge the actuating lever in a second direction opposite to the first direction, the spring acting upon the actuating lever near the bend.

14. A pedal displacement sensor having at least one actuating lever which is arranged in a housing, the lever being rotated by a pedal about a rotational axis, and having at least one switching element having an actuating element which is actuated by rotating the actuating lever, characterized by:
the housing having an opening; and
the actuating lever extending through the opening to an end which is exterior to the housing and which is operatively coupled to the pedal, the actuating lever acting upon a transducer which generates an electrical signal which represents a rotational position of the actuating lever, the transducer comprises a Hall sensor and a magnet, the magnet is a permanent magnet which is mounted on the actuating lever, and the Hall sensor is fixedly mounted in the housing within a magnetic field of the permanent magnet, and the permanent magnet is arranged on the actuating lever near the rotational axis so that an axis connecting a magnetic north pole and a magnetic south pole thereof extends approximately perpendicular to the rotational axis.

* * * * *